United States Patent
Koyata et al.

(10) Patent No.: US 7,643,707 B2
(45) Date of Patent: Jan. 5, 2010

(54) LIGHTING APPARATUS

(75) Inventors: Yasuharu Koyata, Tokyo (JP);
Yoshihito Hirano, Tokyo (JP); Kiyohide Sakai, Tokyo (JP); Masao Imaki, Tokyo (JP); Shinsuke Shikama, Tokyo (JP); Jiro Suzuki, Tokyo (JP); Takao Endou, Tokyo (JP); Kouhei Teramoto, Tokyo (JP); Shigenori Shibue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 133 days.

(21) Appl. No.: 11/920,862

(22) PCT Filed: Jul. 11, 2005

(86) PCT No.: PCT/JP2005/012736

§ 371 (c)(1),
(2), (4) Date: Nov. 21, 2007

(87) PCT Pub. No.: WO2007/007388

PCT Pub. Date: Jan. 18, 2007

(65) Prior Publication Data

US 2009/0109698 A1    Apr. 30, 2009

(51) Int. Cl.
*G02F 1/01* (2006.01)
*F21V 7/04* (2006.01)

(52) U.S. Cl. ............... 385/1; 385/5; 385/146; 385/901; 385/32; 362/551; 362/552; 362/553

(58) Field of Classification Search ......... 385/1, 385/4, 5, 100, 115, 116, 123, 133, 132, 146, 385/147, 901, 95, 96, 31, 32; 362/551, 552, 362/554, 556, 558, 559, 582, 553
See application file for complete search history.

(56) References Cited

U.S. PATENT DOCUMENTS

| 3,588,217 | A | | 6/1971 | Mathisen |
| 5,634,704 | A | | 6/1997 | Shikama et al. |
| 5,715,337 | A | * | 2/1998 | Spitzer et al. ............... 385/4 |
| 5,956,447 | A | * | 9/1999 | Zel'Dovich et al. ......... 385/116 |
| 6,976,778 | B2 | * | 12/2005 | Kamijima ................... 362/583 |
| 7,195,375 | B2 | * | 3/2007 | Jain .......................... 362/301 |
| 7,235,047 | B2 | * | 6/2007 | MacAulay et al. .......... 600/182 |

(Continued)

FOREIGN PATENT DOCUMENTS

JP        49-48979 A    5/1974

(Continued)

*Primary Examiner*—Brian M Healy
(74) *Attorney, Agent, or Firm*—Birch, Stewart, Kolasch & Birch, LLP

(57) ABSTRACT

Provided is a lighting apparatus capable of uniformly and efficiently lighting a spatial light modulator. The lighting apparatus includes: a light source for outputting laser light; a multimode optical fiber in which the laser light outputted from the light source propagates through an internal core whose lateral cross section is a substantially polygonal outer diameter shape; and spatial light modulator for producing an image with illumination light from the multimode optical fiber. In the lighting apparatus, the laser light is outputted from the light source and is propagated to the multimode optical fiber in which an outer diameter shape of the lateral cross section of the core is a substantially polygonal shape, whereby the spatial light modulator can be uniformly and efficiently lighted.

12 Claims, 8 Drawing Sheets

U.S. PATENT DOCUMENTS

| | | | |
|---|---|---|---|
| 7,331,694 B2 * | 2/2008 | Lee et al. | 362/335 |
| 2007/0041420 A1 | 2/2007 | Imaki et al. | |

FOREIGN PATENT DOCUMENTS

| | | |
|---|---|---|
| JP | 7-98479 A | 4/1995 |
| JP | 2000-121836 A | 4/2000 |
| JP | 2004-165396 A | 6/2004 |
| JP | 2004-264831 A | 9/2004 |
| JP | 2005-109036 A | 4/2005 |
| WO | WO-2004/102752 A1 | 11/2004 |

* cited by examiner

LIGHTING APPARATUS

TECHNICAL FIELD

The present invention relates to a lighting apparatus, and more particularly, to a technique for uniformly and efficiently lighting a spatial light modulating means and removing speckle observed in a light beam of a laser in a projection type display in which the laser is used as a light source and a liquid crystal or a digital micromirror device (DMD) is used as the spatial light modulating means.

BACKGROUND ART

Various types of projection type displays are currently used as image display devices for consumer TV, presentation, industry, large theater, and the like. In general, light is emitted to a spatial light modulating means called a light valve (optical valve) to form an image and then light passing therethrough or light reflected thereon is projected to an auxiliary surface such as a screen to display the image.

In a generally employed structure of the projection type displays, an optical system for lighting the light valve with light emitted from a light source is called a lighting optical system and an optical system for enlarging and projecting a light beam emitted from the light valve is called a projection optical system.

The lighting optical system for the projection type displays requires a function for uniformly lighting the light valve and a function for efficiently lighting the light valve. A spatial intensity distribution of a light beam from a lamp light source is non-uniform. When illumination unevenness occurs on the light valve, a variation in brightness occurs on a projected image. Therefore, a mixing rod (or rod integrator or light tunnel) type optical integrator is used for a method of uniformly lighting the light valve (see, for example, Patent Document 1).

According to this type, a light beam from a light source is condensed by a lens and allowed to enter an incident port of the mixing rod. Then, the entered light beam is repeatedly reflected in the rod and superimposed, so an exit end surface of the rod can be assumed to be a secondary light source having a uniform distribution.

Because of the above-mentioned reason, a numerical aperture (NA) of light incident on the mixing rod is held at a numerical aperture of light exited from the mixing rod. The exited light beam is uniformly emitted without unevenness to the light valve serving as an illuminated surface by a relay optical system (lighting optical system) including a lens and a mirror. The optical integrator has a beam shaping action as another effect thereof. When the light beam having a substantially circular cross sectional shape from the lamp light source is converted into light having a square shape substantially identical to that of the light valve, light use efficiency can be improved.

The exit end surface of the mixing rod is set as the light source and an image from the light source (exit end surface) is formed on the light valve by the relay optical system. Here, assume that the numerical aperture NA of the light exited from the mixing rod is expressed by Nr, an aperture size of the mixing rod is expressed by Wr, the numerical aperture NA of illumination light is expressed by Ni, and an aperture size of the light valve is expressed by Wi. Then, a lateral magnification $\beta$ of the lighting system is expressed by $\beta=Wi/Wr$. When the lighting system satisfies the Abbe sine condition, $\beta=Nr/Ni$, therefore, $Nr \times Wr = Ni \times Wi$, so a product of the numerical aperture and the light source size is maintained. This may be assumed as the Lagrange-Helmholtz invariant in a paraxial region. In actuality, the equal sign is not necessarily satisfied because of lens aberration and eclipse.

Even when the light valve is uniformly and efficiently lighted, the uniform and efficient lighting should be reflected to the screen by the projection optical system. Therefore, it is necessary to match the numerical aperture of the illumination light lighting the light valve with the numerical aperture of the projection optical system. This is because, when the numerical aperture NA of the illumination light is larger than the numerical aperture NA of the projection optical system, illumination light corresponding to a difference therebetween is not incident on the projection optical system, thereby reducing the light use efficiency. Thus, a set of the projection optical system and the lighting optical system and a set of the lighting optical system and the light source cannot be freely selected in numerical aperture and size.

When the lamp light source for the projection type displays is replaced by a laser light source, the widening of color reproduction range obtained by a monochromatic spectrum, an increase in contrast made by light source intensity modulation, the lengthening of life which is caused by using a semiconductor laser or the like, and a reduction in size of an optical system in view of light directivity can be realized. Therefore, performance which is significantly higher than that of the conventional lamp light source can be obtained.

A product of the numerical aperture NA and a beam size in the laser light source becomes very smaller than that in the lamp light source. Therefore, when the numerical aperture NA of the illumination light and the aperture size of the light valve are determined, the numerical aperture NA of the light incident on the mixing rod becomes smaller or the beam size of the incident light becomes smaller. When the numerical aperture NA is small, the number of repetition of total reflection in the rod becomes smaller. When the beam size is small, a bias of a spatial intensity distribution becomes larger in the aperture of the rod. Thus, it is difficult to uniformly light the light valve by the mixing rod used for the conventional lamp light source.

An example of the method of uniformly lighting the light valve includes a method of coupling light from the laser light source to a multimode optical fiber to emit uniformly distributed light exited therefrom to the light valve (see, for example, Patent Document 2).

However, the optical fiber has a circular cross sectional shape and the light exited therefrom becomes a light beam having a substantially circular shape. Therefore, the shape of the light beam is different from that of the light valve, so the light use efficiency reduces.

Laser light has a single wavelength. In order to obtain a wide color reproduction range, laser beams having a plurality of wavelengths corresponding to three primary colors of red (R), green (G), blue (B) are required. Therefore, when the laser beams having the plurality of wavelengths from a plurality of light sources are to be combined with one another and emitted to a single light valve, an optical system for combining the laser beams is complicated, so the apparatus becomes large and expensive.

When laser light is emitted to the light valve and projected to the screen, a light and dark spot pattern which is called speckle appears on an image. This is because, the laser light which is spatially and temporally coherent light is reflected on an optically rough surface or passes therethrough to become light having a different phase, so the light having the different phase is observed as interference light by human's eyes. The speckle becomes an image noise component and thus this is not preferable for an observer.

An example of a method of removing the speckle includes a method of coupling light from a laser light source to a multimode optical fiber and vibrating the optical fiber to cause a mode scramble (see, for example, Patent Document 3).

According to this method, speckle patterns change. When the speckle patterns are superimposed on one another, speckles are averaged and reduced. However, a mechanical apparatus for vibrating the optical fiber is required. The durability of the mechanical apparatus and the optical fiber to be vibrated become a problem. The optical fiber having the circular cross sectional shape generates a skew component along the circumferential direction. Therefore, a spatial bias of the speckle pattern is large, so the speckles cannot be sufficiently removed.

Patent Document 1: U.S. Pat. No. 5,634,704 B
Patent Document 2: JP 2000-121836 A
Patent Document 3: U.S. Pat. No. 3,588,217 B

DISCLOSURE OF THE INVENTION

Problems to be Solved by the Invention

The present invention has been made in view of the above-mentioned points and an object of the present invention is to obtain a lighting apparatus capable of uniformly and efficiently lighting a spatial light modulating means.

Means for Solving the Problems

A lighting apparatus according to the present invention includes: a light source for outputting laser light; a multimode optical fiber in which the laser light outputted from the light source propagates through an internal core whose lateral cross section is a substantially polygonal outer diameter shape; and spatial light modulating means for producing an image with illumination light from the multimode optical fiber.

Effects of the Invention

According to the present invention, the laser light is outputted from the light source. Then, the laser light is propagated to the multimode optical fiber in which an outer diameter shape of the lateral cross section of the core is a substantially polygonal shape. Therefore, the spatial light modulating means can be uniformly and efficiently lighted.

BEST MODE FOR CARRYING OUT THE INVENTION

Hereinafter, in order to explain the present invention in more detail, preferred embodiments of the present invention will be described with reference to the drawings.

EMBODIMENT 1

Figure 1:
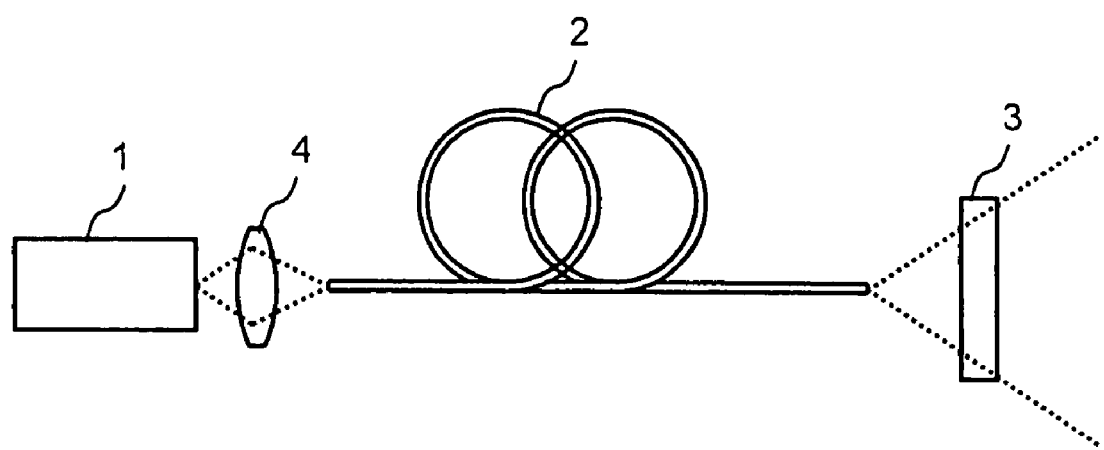
FIG. 1 is a structural diagram showing a lighting apparatus according to Embodiment 1 of the present invention.

FIG. 1 is a structural diagram showing a lighting apparatus according to Embodiment 1 of the present invention.

The lighting apparatus according to Embodiment 1 of the present invention includes a light source, a multimode optical fiber in which an outer diameter shape of a lateral cross section of a core is a square shape, and a spatial light modulating means.

In FIG. 1, a laser in which a semiconductor laser or a solid laser is wavelength-converted by a nonlinear optical material, the semiconductor laser itself, or the like can be used as a light source 1. Outputted laser light has a visible wavelength in a range of approximately 400 nm to 700 nm. For example, the light source is a semiconductor laser which is made of a semiconductor mixed crystal of an InGaAs system compound and has a wavelength of 630 nm, a wavelength conversion laser having a wavelength of 532 nm in which a solid laser made of an Nd:YAG laser medium is wavelength-converted by a nonlinear optical material of $MgO:LiNbO_3$, or a wavelength conversion laser having a wavelength of 473 nm in which the semiconductor laser made of the semiconductor mixed crystal of the InGaAs system compound is wavelength-converted by the nonlinear optical material of $MgO:LiNbO_3$. For simplification, a lighting apparatus using laser light having a single wavelength in the range will be described.

Figure 2:
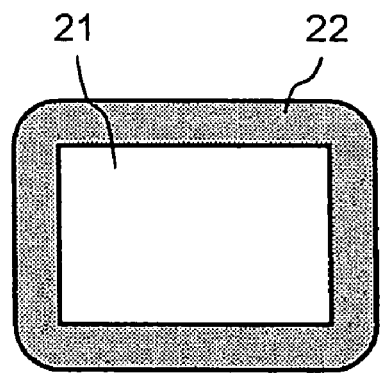
FIG. 2 shows a lateral cross sectional structure of a multimode optical fiber 2 shown in FIG. 1.

FIG. 2 shows a lateral cross sectional structure of a multimode optical fiber 2.

The multimode optical fiber 2 includes a core 21 for propagating light at the center of the lateral cross section thereof and an outer diameter shape thereof is a square shape. One side length of the square shape is approximately several tens μm to several hundreds μm. A clad 22 for totally reflecting light is located around the core 21 and has a refractive index lower than that of the core 21.

A method of manufacturing the multimode optical fiber 2 will be described.

Figure 3:
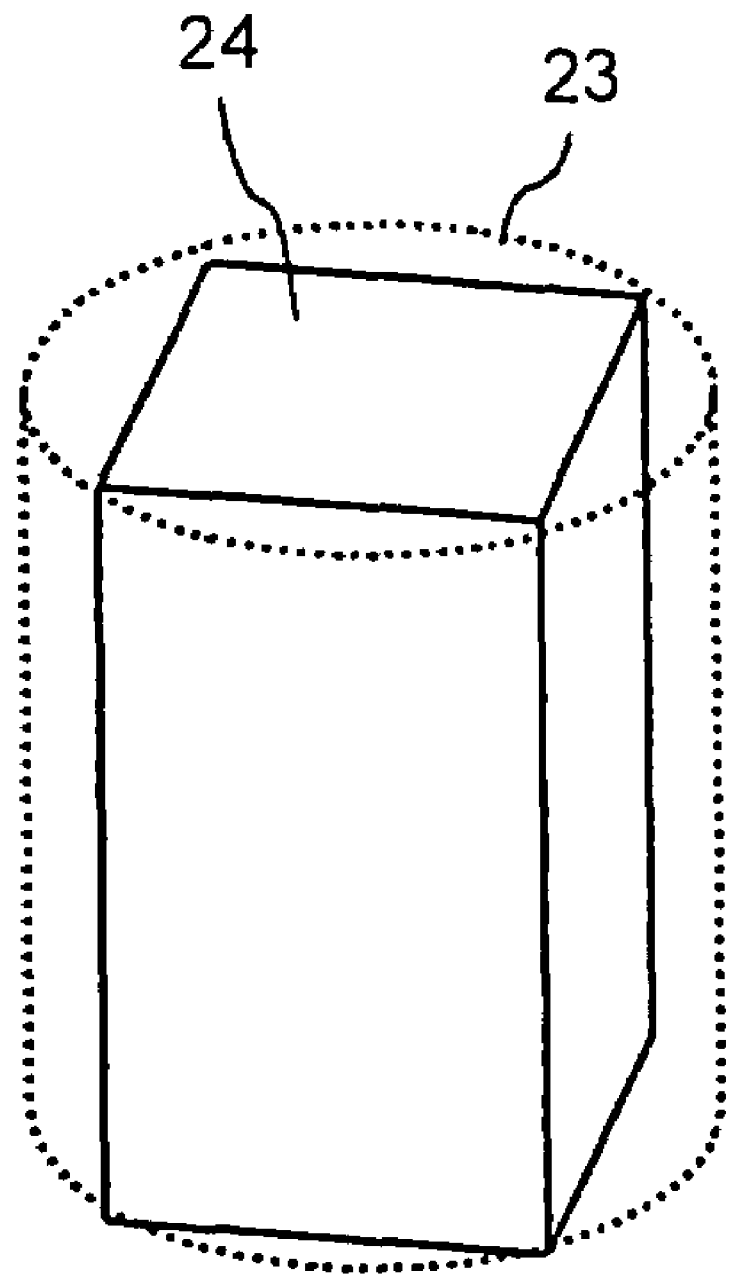
FIG. 3 is an explanatory view showing a method of manufacturing the multimode optical fiber 2 shown in FIG. 1.

First, as shown in FIG. 3, a cylindrical rod material 23 made of quartz is formed in the same manner as a known optical fiber preform manufacturing method such as an MCVD method, an OVD method, or a VAD method.

Then, as shown in FIG. 3, the side surface of the cylindrical rod material 23 is polished so that the lateral cross section is formed in a substantially square shape in which arc shapes are removed from a circular shape along the circumference thereof, thereby producing a preform 24 of a core formation portion. The produced preform 24 is set to a drawing machine and subjected to a drawing process for heating and drawing the preform to reduce the diagonal diameter thereof. A heating temperature in the drawing process is set such that the core formation portion is formed as the core of the optical fiber by the drawing process while the outer diameter shape of the lateral cross section is substantially maintained.

Then, an acrylic resin solution to which a radical generating agent is added is deposited onto a surface of the drawn preform and irradiated with ultraviolet light to cure the solution, thereby forming the clad for coating and protecting the surface of the core.

Therefore, the multimode optical fiber 2 including the core 21 located at the center of the optical fiber and the clad 22 provided to coat the core 21 is manufactured.

In a spatial light modulating means 3, a liquid crystal, a digital micromirror device (DMD), or the like can be used as a modulation medium. According to a system using the liquid crystal, a liquid crystal material is sandwiched by glass substrates or the like to produce an element. An electric field is applied from the outside to the element to produce an image based on a change in optical characteristic of the element which is caused by a change in molecular alignment of the liquid crystal. According to a system using the DMD, micromirrors produced by a micro electro mechanical systems (MEMS) technique are two-dimensionally arranged and tiled to perform ON/OFF driving, thereby producing an image.

Next, the operation will be described.

Laser light outputted from the light source 1 is condensed by a lens 4 and then incident on the multimode optical fiber 2. The numerical aperture NA of the laser light incident on the multimode optical fiber 2 is equal to or smaller than a numerical aperture NA capable of propagating through the optical fiber and a beam size thereof is equal to or smaller than a core size of the optical fiber. In such conditions, the laser light outputted from the light source 1 is directly incident on the multimode optical fiber 2 and thus it is unnecessary to use the lens 4. The laser light is coherent light having higher directivity than lamp light, so the numerical aperture NA of the laser light and the beam size thereof are the numerical aperture NA of the optical fiber and the core size thereof. Therefore, the laser light can be made incident on the optical fiber and propagate therethrough.

The laser light incident on the multimode optical fiber 2 propagates through the core 21 of the multimode optical fiber 2 and exits therefrom. The light is totally reflected, so the laser light can be propagated at high transfer efficiency.

The multimode optical fiber 2 has a large number of modes capable of propagating light. A propagation angle of the highest mode is substantially equal to a total reflection angle. When the propagation angles of modes are assumed to be substantially continuously distributed in a range of 0 to the total reflection angle, the number of modes is equal to or larger than several hundreds to several thousands. The multimode optical fiber 2 is bent at long lengths in the longitudinal direction, so the number of reflection is sufficient. The incident laser light is distributed into a plurality of modes and propagates through the multimode optical fiber 2. Therefore, a spatial intensity distribution of the laser light on the incident end surface of the multimode optical fiber 2 is a Gaussian distribution. On the other hand, spatial intensity distributions of the respective modes on the exit end surface of the multimode optical fiber 2 are superimposed on one another and spatially averaged laser light is exited therefrom.

The outer diameter shape of the lateral cross section of the core 21 of the multimode optical fiber 2 is the square shape. Therefore, the beam shape of the laser light on the incident end surface of the multimode optical fiber 2 is the substantially circular shape. On the other hand, the beam shape of the laser light which is obtained on the exit end surface of the multimode optical fiber 2 is the substantially square shape.

The laser light exited from the multimode optical fiber 2 is emitted to the spatial light modulating means 3. Because of the uniform spatial intensity distribution of the exited laser light, an illuminated surface of the spatial light modulating means 3 can be irradiated with the laser light without unevenness. The illuminated surface of the spatial light modulating means 3 has a square shape. The spatial light modulating means 3 can be irradiated with the laser light at high light use efficiency because the beam shape of the exited laser light is the substantially square shape.

The spatial light modulating means 3 changes the optical characteristics of a device in response to an input signal and locally modulates a beam of the emitted laser light to form an image. When transmission light or reflection light (transmission light in FIG. 1) from the spatial light modulating means 3 is projected to an auxiliary surface such as a screen, the laser light is emitted to the illuminated surface of the spatial light modulating means 3 without unevenness to light the spatial light modulating means 3 at high light use efficiency. Therefore, a bright image having no variation in brightness can be displayed.

According to such a structure, when the outer diameter shape of the lateral cross section of the core of the multimode optical fiber 2 is made substantially equal to the shape of the illuminated surface of the spatial light modulating means 3, the spatial light modulating means 3 can be uniformly and efficiently lighted. For example, when the illuminated surface of the spatial light modulating means 3 has a rectangular shape whose aspect ratio is 4:3, a shape similar to the rectangular shape whose aspect ratio is 4:3 is set as the outer diameter shape of the lateral cross section of the core of the multimode optical fiber 2. When the illuminated surface of the spatial light modulating means 3 has a regular hexagonal shape, a shape similar to the regular hexagonal shape is set as the outer diameter shape of the lateral cross section of the core of the multimode optical fiber 2.

The numerical aperture NA of the exited light from the multimode optical fiber 2 is equal to the numerical aperture NA of the optical fiber, so the numerical aperture NA of the incident light is not held. Therefore, even when the numerical aperture NA of the illumination light, the size of the illuminated surface of the spatial light modulating means 3, and the core size of the optical fiber 2 are determined, the numerical aperture NA of the incident light can be arbitrarily set to a value equal to or smaller than the numerical aperture NA of the optical fiber 2. Thus, the reliability of the optical system can be improved.

The multimode optical fiber 2 can be freely bent, so a size of the apparatus can be reduced and a configuration thereof can be freely set. Therefore, the apparatus can be reduced in cost.

When a relay optical system (lighting optical system) including a lens and a mirror is provided between the multimode optical fiber 2 and the spatial light modulating means 3, the spatial intensity distribution of the laser light and the beam shape thereof on the exit end surface of the multimode optical fiber 2 (this corresponds to a secondary light source for original laser light) can be directly transferred as an image to the illuminated surface of the spatial light modulating means 3. Therefore, the spatial light modulating means 3 can be more effectively lighted uniformly and efficiently. The core size and the numerical aperture of the optical fiber 2 are smaller than those of the rod integrator, so the lens included in the relay optical system (lighting optical system) can be reduced in size. An optical path of a conventional relay optical system is folded because of a reduction in size of the apparatus. A folding mirror and a prism can be reduced in size for the same reason. Constituent members of the relay optical system become smaller, so the cost of the apparatus can be reduced.

Figure 4:
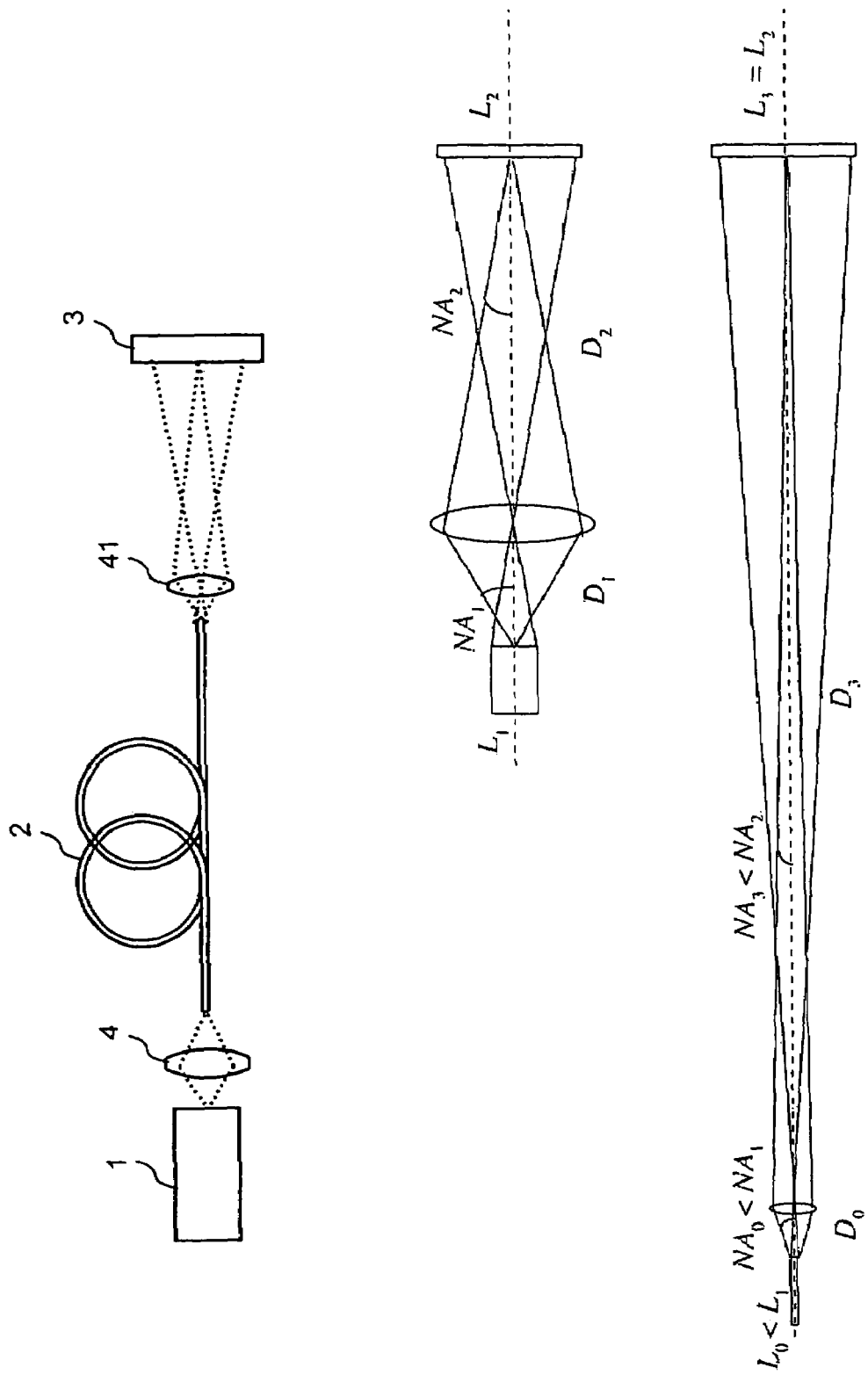
FIG. 4 are explanatory diagrams showing the case where a light source is changed from a mixing rod (which is a secondary light source of a lamp light source) to a fiber (which is a secondary light source of a laser).

To be specific, the following numerical values are provided with reference to FIG. 4.

Mixing rod $L_1$=8 mm, $NA_1$=0.5 ($\theta_1$=30.0 degrees), and product=4.0

Fiber $L_0$=0.6 mm, $NA_1$=0.22 ($\theta_1$=12.7 degrees), product=0.132

The latter product is 30 times smaller than the former. When the same light valve is to be lighted using the mixing rod and the fiber, $NA_3$ of the illumination light becomes 30 times smaller than that of $NA_2$ by only changing a light source from the mixing rod (which is a secondary light source of a lamp light source) to the fiber (which is a secondary light source of the laser) because the aperture size of the light valve is the same ($L_2$=$L_3$).

Many conventional lighting optical systems employ a telecentric optical system in order to obtain a high peripheral light amount ratio. However, when NA is reduced by 30 times, an illumination light beam becomes a light beam close to parallel light without using the telecentric optical system. Although the telecentric optical system requires a lens whose size is equal to that of the illuminated surface (large lens), it is unnecessary to construct such an optical system.

The light valves are reduced in size each year for reducing costs. In order to light a small region at the held numerical aperture, it is necessary to reduce a product of the numerical aperture of the light source side and the size thereof. For the same reason, this problem can be also solved by only changing the light source from the mixing rod (which is the secondary light source of the lamp light source) to the fiber (which is the secondary light source of the laser).

EMBODIMENT 2

A lighting apparatus according to Embodiment 2 of the present invention includes a light source, a multimode optical fiber in which an outer diameter shape of a lateral cross section of a core is a circular shape, a multimode optical fiber in which an outer diameter shape of a lateral cross section of a core is a square shape, and a spatial light modulating means.

Embodiment 1 shows the case where the outer diameter shape of the lateral cross section of the core of the entire multimode optical fiber is the square shape. On the other hand, Embodiment 2 shows a case where the outer diameter shape of the lateral cross section of the core of a multimode optical fiber including the end surface from which the laser light is outputted is the square shape and the outer diameter shape of the lateral cross section of the core of the other multimode optical fiber including the end surface on which the laser light is incident is the circular shape.

Figure 5:
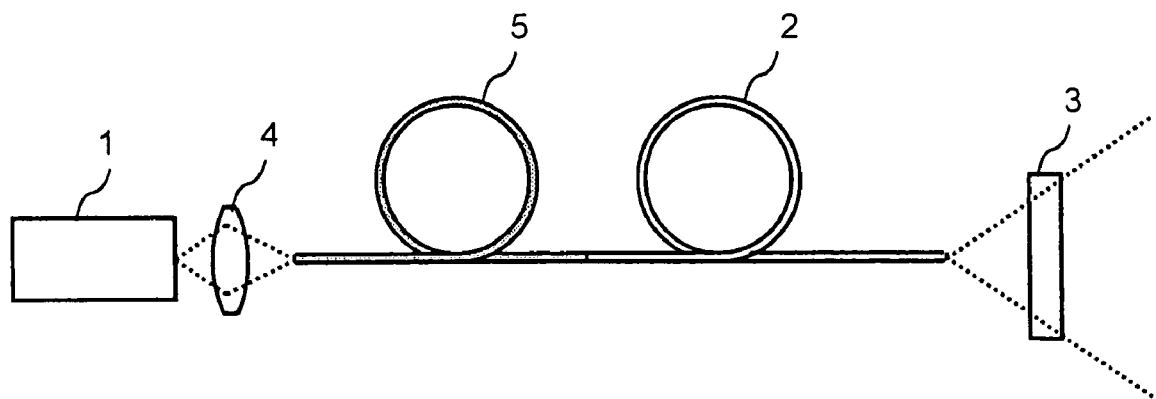
FIG. 5 is a structural diagram showing a lighting apparatus according to Embodiment 2 of the present invention.

FIG. 5 is a structural diagram showing the lighting apparatus according to Embodiment 2 of the present invention.

The structure shown in FIG. 5 is similar to that of the lighting apparatus of FIG. 1 and has similar functions to those of the lighting apparatus of FIG. 1 unless otherwise specified.

In FIG. 5, with respect to the multimode optical fibers, a multimode optical fiber 5 in which the outer diameter shape of the lateral cross section of the core is the circular shape is fusion-spliced to the multimode optical fiber 2 in which the outer diameter shape of the lateral cross section of the core is the square shape. The NA of the circular multimode optical fiber 5 is substantially equal to the NA of the square multimode optical fiber 2.

Figure 6:
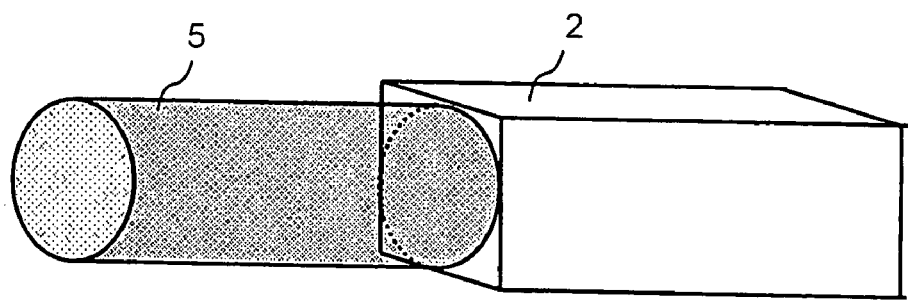
FIG. 6 is an explanatory view showing a multimode optical fiber shown in FIG. 5.

As shown in FIG. 6, a diameter of the circular core of the circular multimode optical fiber 5 is substantially equal to a side length of the square core of the square multimode optical fiber 2. Therefore, the fusion splicing is easy and a coupling loss of the laser light which is exited from the circular multimode optical fiber 5 and then incident on the square multimode optical fiber 2 is small.

Next, the operation will be described.

As in Embodiment 1, laser light outputted from the light source 1 is condensed by the lens 4 and then incident on the multimode optical fiber 5. The laser light incident on the multimode optical fiber 5 in which the outer diameter shape of the lateral cross section of the core is the circular shape propagates through the core of the multimode optical fiber 5 and exits from the multimode optical fiber 2 in which the outer diameter shape of the lateral cross section of the core is the square shape.

The multimode optical fiber 5 in which the outer diameter shape of the lateral cross section of the core is the circular shape is bent at long lengths in the longitudinal direction, so the number of reflection is sufficient. The incident laser light is distributed into a plurality of modes and propagates through the circular multimode optical fiber 2. Therefore, a spatial intensity distribution of the laser light on an incident end surface of the circular multimode optical fiber 5 is a Gaussian distribution. On the other hand, spatial intensity distributions of the respective modes on an exit end surface of the circular multimode optical fiber 5 are superimposed on one another and spatially averaged laser light is exited therefrom.

The multimode optical fiber 2 in which the outer diameter shape of the lateral cross section of the core is the square shape has a large number of modes different from those of the circular multimode optical fiber 5 and is bent at long lengths in the longitudinal direction, so the number of reflection is sufficient. The laser light which is exited from the circular multimode optical fiber 5 and then incident on the square multimode optical fiber 2 is distributed into a plurality of different modes and propagates through the multimode optical fiber. Therefore, the spatial intensity distributions of the respective modes on the exit end surface of the multimode optical fiber are superimposed on one another and more effectively spatially averaged laser light is exited therefrom.

As in Embodiment 1, the laser light exited from the multimode optical fiber is emitted to the spatial light modulating means 3. Because of the uniform spatial intensity distribution of the exited laser light, the illuminated surface of the spatial light modulating means 3 can be irradiated with the laser light without unevenness. The illuminated surface of the spatial light modulating means 3 has the square shape. The laser light can be irradiated on the spatial light modulating means 3 at high light use efficiency because the beam shape of the exited laser light is the substantially square shape.

According to such a structure, the multimode optical fiber 5 in which the outer diameter shape of the lateral cross section of the core is the circular shape and the light source for generating the laser light can be fusion-spliced for use. The multimode optical fibers can be freely bent, so a size of the apparatus can be reduced and an arrangement thereof can be freely set, whereby the apparatus can be reduced in cost.

EMBODIMENT 3

A lighting apparatus according to Embodiment 3 of the present invention includes a plurality of light sources, a multimode optical fiber in which an outer diameter shape of a lateral cross section of a core having multiple branches is a square shape, and one spatial light modulating means.

Embodiment 1 shows the case where the signal light source and the single multimode optical fiber are provided. On the other hand, Embodiment 3 shows a case where three light sources and three branch multimode optical fibers.

Figure 7:
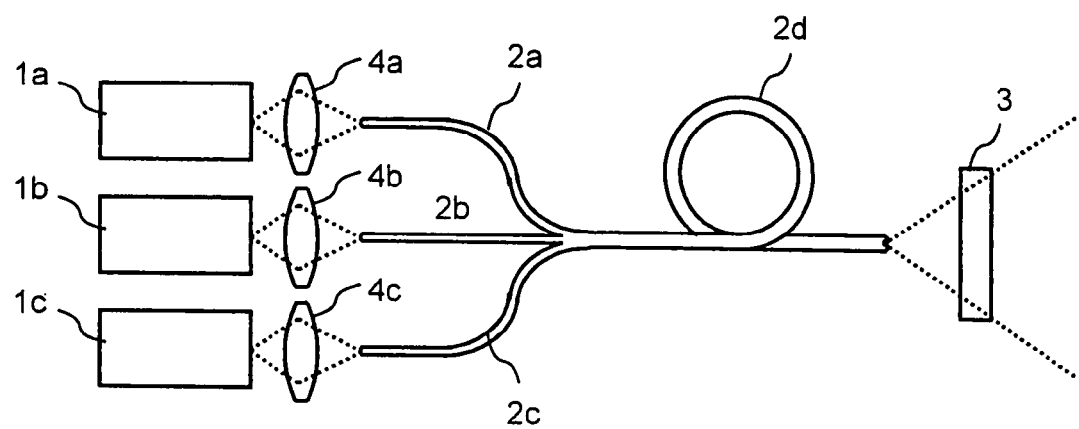
FIG. 7 is a structural diagram showing a lighting apparatus according to Embodiment 3 of the present invention.

FIG. 7 is a structural diagram showing the lighting apparatus according to Embodiment 3 of the present invention.

The structure shown in FIG. 7 is similar to that of the lighting apparatus of FIG. 1 and has similar functions to those of the lighting apparatus of FIG. 1 unless otherwise specified.

In FIG. 7, three light sources 1a, 1b, and 1c are provided and can be used by a combination of a laser in which a semiconductor laser or a solid laser is wavelength-converted by a nonlinear optical material, the semiconductor laser itself, or the like. Outputted three laser beams have a visible wavelength in a range of approximately 400 nm to 700 nm. For example, the three light sources are a semiconductor laser which is made of a semiconductor mixed crystal of an InGaAs system compound and has a wavelength of 630 nm, a wavelength conversion laser having a wavelength of 532 nm in which a solid laser made of an Nd:YAG laser medium is wavelength-converted by a nonlinear optical material of $MgO:LiNbO_3$, and a wavelength conversion laser having a wavelength of 473 nm in which the semiconductor laser made of the semiconductor mixed crystal of the InGaAs system compound is wavelength-converted by the nonlinear optical material of $MgO:LiNbO_3$. For simplification, a lighting apparatus using the three-wavelength laser beams will be described.

Figure 8:
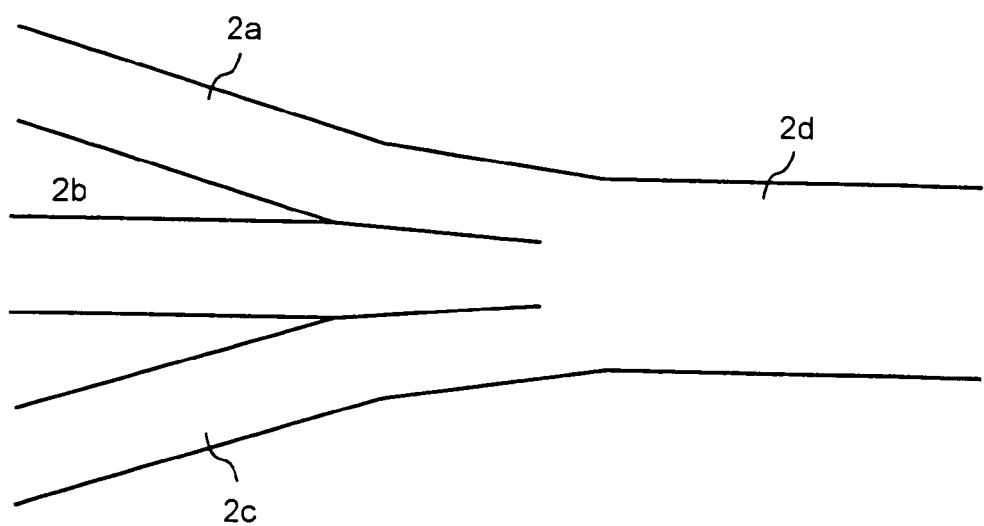
FIG. 8 shows a longitudinal cross sectional structure of a multimode optical fiber shown in FIG. 7.

FIG. 8 shows a lateral cross sectional structure of a multimode optical fiber.

With respect to the multimode optical fiber, three multimode optical fibers 2a, 2b, and 2c are combined to a single multimode optical fiber 2d by fusion splicing. The outer diameter shape of the lateral cross section of the core of the combined single multimode optical fiber 2d is the square shape. The combined single multimode optical fiber 2d has a NA larger than that of each of the three branch multimode optical fibers 2a, 2b, and 2c. In addition, the combined single multimode optical fiber 2d has a diameter larger than that of each of the three branch multimode optical fibers 2a, 2b, and 2c. Therefore, a coupling loss of a laser beam incident from the three branch multimode optical fibers 2a, 2b, and 2c on the single multimode optical fiber 2d is small. This embodiment shows a case where the outer diameter shape of the lateral cross section of the core in each of the three branch multimode optical fibers 2a, 2b, and 2c is the square shape. However, the circular shape may be used.

Next, the operation will be described.

As in Embodiment 1, each laser light outputted from three light sources 1a, 1b, and 1c is condensed by lenses 4a, 4b, and 4c and then incident on each of the multimode optical fibers 2a, 2b, and 2c. Each laser light incident on the three branch multimode optical fiber 2a, 2b, and 2c propagates through the core of each of the multimode optical fibers and exits from the combined single multimode optical fiber 2d.

The three branch multimode optical fibers 2a, 2b, and 2c are bent at long lengths in the longitudinal direction, so the number of reflection is sufficient. Each of the incident laser beams is distributed into a plurality of modes and propagates through corresponding one of the multimode optical fibers. The combined single multimode optical fiber 2d has a large number of modes different from those of the three branch multimode optical fibers 2a, 2b, and 2c and is bent at long lengths in the longitudinal direction, so the number of reflection is sufficient. Each of the laser beams which are exited from the three branch multimode optical fibers 2a, 2b, and 2c and then incident on the combined single multimode optical fiber 2d is distributed into a plurality of different modes and propagates through corresponding one of the multimode optical fibers.

Therefore, a spatial intensity distribution of the laser beam on an incident end surface of each of the three branch multimode optical fibers 2a, 2b, and 2c is a Gaussian distribution. On the other hand, spatial intensity distributions of the respective modes on an exit end surface of the combined single multimode optical fiber 2d are superimposed on one another and spatially averaged laser beam is exited therefrom. Therefore, the three-wavelength laser beams can be combined with each other by the single multimode optical fiber.

As in Embodiment 1, the laser light exited from the combined single multimode optical fiber 2d is emitted to the spatial light modulating means 3. Because of the uniform spatial intensity distribution of the exited laser light, the illuminated surface of the spatial light modulating means 3 can be irradiated with the laser light without unevenness. The illuminated surface of the spatial light modulating means 3 has the square shape. The laser light can be emitted to the spatial light modulating means 3 at high light use efficiency because the beam shape of the exited laser light is the substantially square shape.

The spatial light modulating means 3 changes the optical characteristics of a device in response to an input signal and locally modulates the emitted three-wavelength laser beams to form an image. When the three-wavelength laser beams are temporally divided by a pulse operation of the light sources or filters to light the spatial light modulating means, an image having a wide color reproduction range can be obtained.

According to such a structure, the laser beams from the plurality of the light sources 1a, 1b, and 1c can be combined for use. The laser beam having the plurality of wavelengths which is obtained by combining the plural-wavelength laser beams can be emitted to the single spatial light modulating means 3 and a high-power laser beam obtained by combining laser beams having the same wavelength can be emitted to the single spatial light modulating means 3. The multimode optical fiber can be freely bent, so a size of the apparatus and a configuration thereof can be freely set. Therefore, the apparatus can be reduced in cost.

EMBODIMENT 4

A lighting apparatus according to Embodiment 4 of the present invention includes a light source, a multimode optical fiber in which an outer diameter shape of a lateral cross section of a core is a square shape, an optical fiber deforming means, and a spatial light modulating means.

Figure 9:
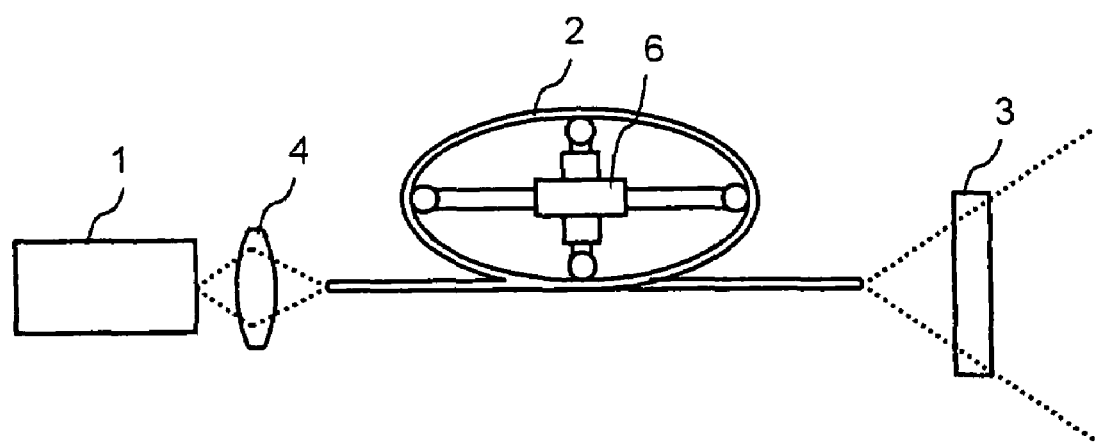
FIG. 9 is a structural diagram showing a lighting apparatus according to Embodiment 4 of the present invention.

FIG. 9 is a structural diagram showing the lighting apparatus according to Embodiment 4 of the present invention.

The structure shown in FIG. 9 is similar to that of the lighting apparatus of FIG. 1 and has similar functions to those of the lighting apparatus of FIG. 1 unless otherwise specified.

Figure 10A:
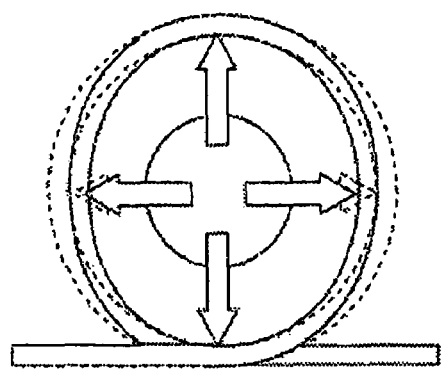
FIG. 10A shows an example in which extension amplitudes of arms operated by an optical fiber deforming means 6 shown in FIG. 9 are separately provided.
Figure 10B:
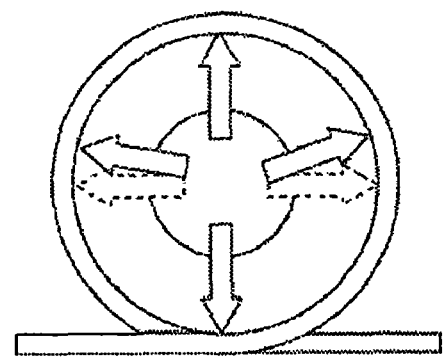
FIG. 10B shows an example in which the extension amplitudes of the arms operated by the optical fiber deforming means 6 shown in FIG. 9 are equal to one another and position intervals of the optical fiber are separately provided.
Figure 10C:
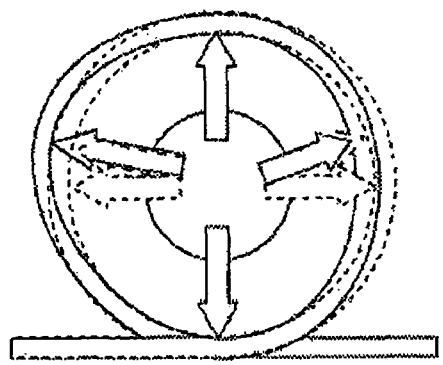
FIG. 10C shows an example in which the extension amplitudes of the arms operated by the optical fiber deforming means 6 shown in FIG. 9 and the position intervals of the optical fiber are separately provided.

In FIG. 9, an optical fiber deforming means 6 temporally deforms a bent shape of the multimode optical fiber 2 in the longitudinal direction. For example, this is a mechanism for deforming a substantially elliptical shape of the wound optical fiber by extendable arms. As shown in FIG. 10A, the extension amplitudes of the arms may be separately provided. As shown in FIG. 10B, the extension amplitudes of the arms may be equal to one another and the position intervals of the optical fiber may be separately provided. As shown in FIG. 10C, the extension amplitudes of the arms and the position intervals of the optical fiber may be separately provided.

Next, the operation will be described.

As in Embodiment 1, laser light outputted from the light source 1 is condensed by the lens 4 and then incident on the multimode optical fiber 2. The laser light incident on the multimode optical fiber 2 propagates through the core of the multimode optical fiber 2 and exits therefrom.

Figure 11:
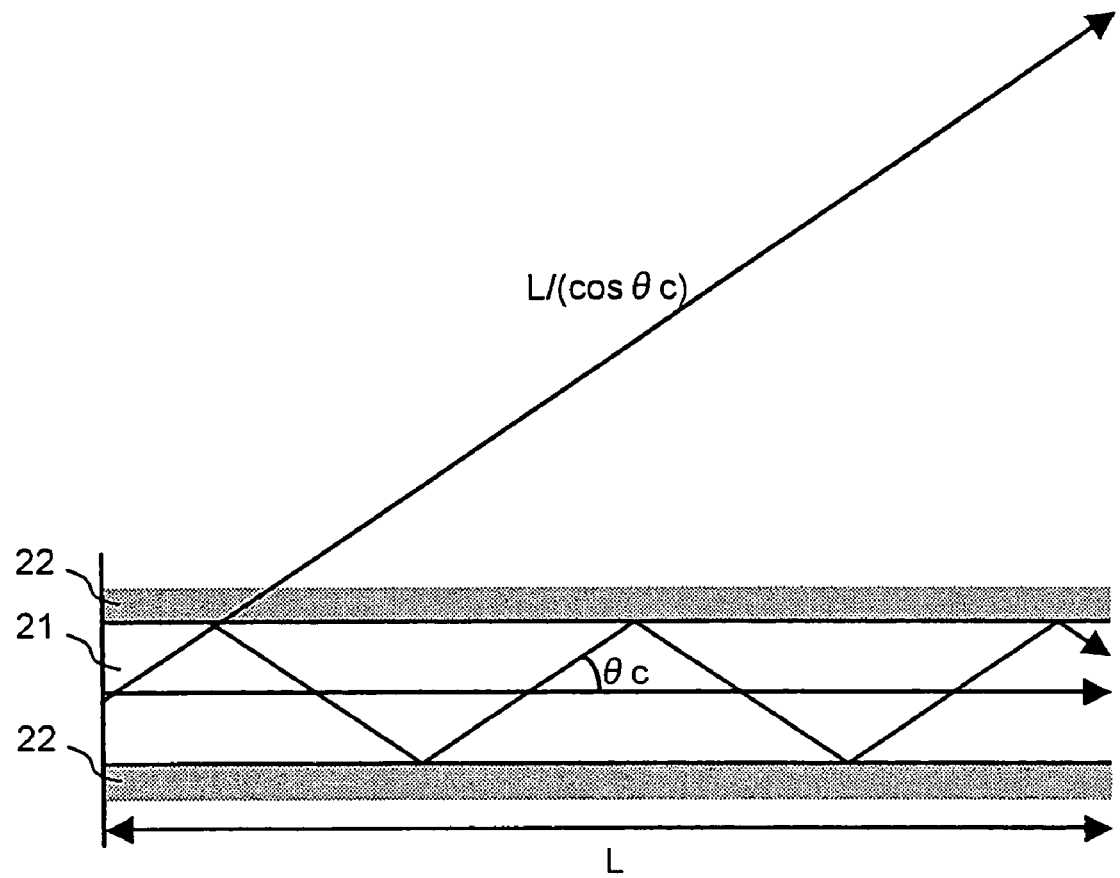
FIG. 11 is an explanatory diagram showing a propagation time difference between a fundamental mode and the highest mode in the case where light propagates through the multimode optical fiber 2 shown in FIG. 9 over a distance L.

The lowest mode (fundamental mode) of the multimode optical fiber 2 has a very small propagation angle and propagates substantially parallel to the optical axis of the optical fiber, so the fundamental mode reaches the exit end at the earliest time. On the other hand, the propagation angle of the highest mode is substantially equal to a total reflection angle θc, so, as shown in FIG. 11, the highest mode equivalently propagates over a distance longer than that of the fundamental mode by 1/cos θc times. Thus, a propagation time difference Δt between the fundamental mode and the highest mode in the case where the fundamental mode propagates over a distance L is expressed by the expression (1).

$$\Delta t = \frac{n1 - L}{c} \cdot \left( \frac{1}{\cos \theta_c} - 1 \right)$$ [Expression 1]

When the bent shape of the multimode optical fiber 2 in the longitudinal direction is temporally deformed by the optical fiber deforming means 6, the propagation angle of light temporally changes. In other words, the order of the mode temporally changes. The propagation time is changed according to the order of the mode, so the phase of each mode temporally shifts. With respect to speckle, spatially and temporally coherent laser light is reflected on an optically rough surface such as a screen (object surface) or passes therethrough to become light having a different phase, so the light having the different phase is observed as interference light by human's eyes (image plane). Because the phase of each mode temporally shifts, a speckle pattern temporally changes.

The reason why light can be recognized as a stable image by a human is that, the visual sense to light stimulation is maintained for a predetermined period, and the sense that simultaneous shinning occurs is produced when a stimulus further reaches another location of a visual field during the period. At this time, if a subsequent light stimulus reaches the same location while the optical fiber is held without vibration, the strengths of the sense are added to each other (integrated). According to a method of providing two light stimuli at a short time interval, adjusting the strength of a light stimulus, and determining a threshold in which the light stimulus is sensed, it is found that the two stimuli are completely added to each other and thus become equal to a single light stimulus at a time interval of up to approximately 20 ms. The speckle pattern is changed by the optical fiber deforming means 6 at a time interval equal to or smaller than 20 ms. Therefore, the speckle can be removed by a temporal addition effect (time integration effect).

The outer diameter shape of the lateral cross section of the core of the multimode optical fiber 2 is the square shape. Thus, a skew component along the circumferential direction of the optical fiber is reduced and the speckle pattern becomes spatially uniform, with the result that the speckle can be more effectively removed.

As in Embodiment 1, the laser light exited from the multimode optical fiber 2 is emitted to the spatial light modulating means 3. Because of the uniform spatial intensity distribution of the exited laser light, the illuminated surface of the spatial light modulating means 3 can be irradiated with the laser light without unevenness. The illuminated surface of the spatial light modulating means 3 has the square shape. The laser light can be emitted to the spatial light modulating means 3 at high light use efficiency because the beam shape of the exited laser light is the substantially square shape.

The spatial light modulating means 3 changes the optical characteristics of a device in response to an input signal and locally modulates a beam of the emitted laser light to form an image. When transmission light or reflection light from the spatial light modulating means 3 is projected to an auxiliary surface such as a screen, the speckle pattern temporally changes. Therefore, the speckle can be removed and a bright image having no variation in brightness can be displayed.

EMBODIMENT 5

A lighting apparatus according to Embodiment 5 of the present invention includes a light source, a multimode optical fiber in which an outer diameter shape of a lateral cross section of a core is a substantially polygonal shape in which each side is curved and a spatial light modulating means.

Figure 12:
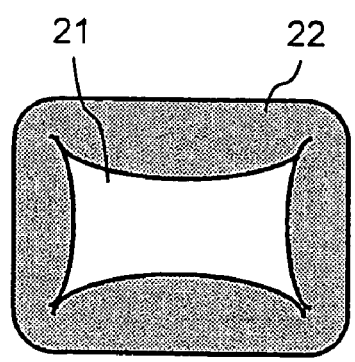
FIG. 12 shows a lateral cross sectional structure of a multimode optical fiber of a lighting apparatus according to Embodiment 5 of the present invention.

FIG. 12 is an explanatory view showing the lighting apparatus according to Embodiment 5 of the present invention and shows a lateral cross sectional structure of the multimode optical fiber. The structure in Embodiment 5 of the present invention is similar to that of the lighting apparatus of FIG. 1 and has similar functions to those of the lighting apparatus of FIG. 1 unless otherwise specified.

With respect to the lateral cross sectional structure of the multimode optical fiber in the lighting apparatus according to Embodiment 5 of the present invention as shown in FIG. 12, the outer diameter shape of the lateral cross section of the core 21 of the multimode optical fiber 2 is a square outer diameter shape in which each side is curved. Reference numeral 22 denotes the clad surrounding the core.

A method of manufacturing the multimode optical fiber 2 will be described as in Embodiment 1.

The cylindrical rod material made of quartz is formed in the same manner as a known optical fiber preform manufacturing method such as an MCVD method, an OVD method, or a VAD method. Then, the side surface of the cylindrical rod material is polished, so the lateral cross section is formed in a substantially square shape in which arc shapes are removed from a circular shape along the circumference thereof. Then, arc shapes are removed from the substantially square shape to form a substantially square shape in which each side is curved, thereby producing a preform of a core formation portion. The produced preform is set to a drawing machine and subjected to a drawing process for heating and drawing the preform to reduce the diameter thereof.

A heating temperature in the drawing process is set such that the core formation portion is formed as the core of the optical fiber by the drawing process while the outer diameter shape of the lateral cross section is substantially maintained. Then, an acrylic resin solution to which a radical generating agent is added is deposited onto a surface of the drawn preform and irradiated with ultraviolet light to cure the solution, thereby forming the clad for coating and protecting the surface of the core.

Therefore, the multimode optical fiber 2 including the core 21 located at the center of the optical fiber and the clad 22 provided to coat the core 21 is manufactured.

Next, the operation will be described.

As in Embodiment 1, laser light outputted from the light source 1 is condensed by the lens 4 and then incident on the multimode optical fiber 2. The laser light incident on the multimode optical fiber 2 propagates through the core 21 of the multimode optical fiber 2 and exits therefrom.

The outer diameter shape of the lateral cross section of the core 21 of the multimode optical fiber 2 is the square shape in which each side is curved. Therefore, the beam shape of the laser light on the incident end surface of the multimode optical fiber 2 is the substantially circular shape. In contrast to this, the beam shape of the laser light which is obtained on the exit end surface of the multimode optical fiber 2 is a substantially square shape in which each side is curved.

The laser light exited from the multimode optical fiber 2 is emitted to the spatial light modulating means 3. The light outputted from the multimode optical fiber 2 propagates through the spatial light modulating means 3, so the beam shape in the lateral cross section is deformed by diffraction to obtain the laser light having the substantially square beam shape. Because of the uniform spatial intensity distribution of the exited laser light, the illuminated surface of the spatial light modulating means 3 can be irradiated with the laser light without unevenness. The illuminated surface of the spatial light modulating means 3 has the square shape. The laser light can be emitted to the spatial light modulating means 3 at high light use efficiency because the beam shape of the exited laser light is the substantially square shape.

The invention claimed is:

1. A lighting apparatus, comprising:
   a light source for outputting laser light;
   a multimode optical fiber in which the laser light outputted from the light source propagates through an internal core whose lateral cross section is a substantially polygonal outer diameter shape; and
   spatial light modulating means for producing an image with illumination light from the multimode optical fiber.

2. The lighting apparatus according to claim 1, wherein the multimode optical fiber is a multimode optical fiber in which a lateral cross section of a core is a circular outer diameter shape fusion-spliced to a multimode optical fiber in which a lateral cross section of a core is a square outer diameter shape.

3. The lighting apparatus according to claim 1, wherein
   the light source comprises at least two light sources,
   the multimode optical fiber comprises:
     at least two multimode optical fibers on which laser beams outputted from the respective light sources are incident, and
     a multimode optical fiber for combining the laser beams from the at least two multimode optical fibers and outputting a combined laser beam.

4. The lighting apparatus according to claim 1, further comprising optical fiber deforming means for temporally deforming a bent shape of at least a part of the multimode optical fiber in a longitudinal direction thereof.

5. The lighting apparatus according to claim 1, wherein the lateral cross section of a part of the core including a light exit end surface of the multimode optical fiber is a substantially polygonal outer diameter shape in which each side is curved, said part of the core propagates the outputted laser light to the spatial light modulating means, and the multimode optical fiber deforms a beam shape in the lateral cross section by diffraction.

6. The lighting apparatus according to claim 4, wherein the deforming means is controlled to remove a speckle pattern from the image.

7. A system comprising the lighting apparatus of claim 1 and further comprising a screen onto which the spatial modulating means projects the image.

8. A method of transmitting light implemented in a projection type display device, the method comprising:
   transmitting laser light from a light source through an internal core of a multimode optical fiber to generate an illumination light, at least a portion of the internal core having a lateral cross section of a substantially polygonal outer diameter shape; and
   spatially modulating the illumination light exiting from the multimode optical fiber to produce an image, the spatially modulated light being projected to a screen to display the image.

9. The method according to claim 8, wherein the multimode optical fiber is comprised of a multimode optical fiber in which a lateral cross section of a core is a circular outer diameter shape fusion-spliced to a multimode optical fiber in which a lateral cross section of a core is a square outer diameter shape.

10. The method according to claim 8, wherein the light source comprises at least two light sources, and the multimode optical fiber comprises at least two branch multimode optical fibers which combine into a single multimode optical fiber,
    wherein the transmitting step includes transmitting laser beams from the at least two light sources through the at least two branch multimode optical fibers, respectively, the laser beams being combined into a laser beam which propagates through the single multimode optical fiber.

11. The method according to claim 8, further comprising temporally deforming a bent shape of at least a part of the multimode optical fiber in a longitudinal direction thereof in order to remove a speckle pattern from the image.

12. The method according to claim 8, wherein the spatially demodulating step is performed by at least one of a liquid crystal device and a digital multimirror device, the at least one of the liquid crystal device and digital mirror device being configured to transmit the spatially demodulated light to the screen.

* * * * *